(12) United States Patent
Dernebo (10) Patent No.: US 9,344,018 B2
(45) Date of Patent: May 17, 2016

(54) METHOD FOR MAKING A MOTOR QUIETER

(71) Applicant: LD Design Electronics AB, Odeshog (SE)

(72) Inventor: Lars Dernebo, Odeshog (SE)

(73) Assignee: LD Design Electronics AB, Odeshog (SE)

( * ) Notice: Subject to any disclaimer, the term of this patent is extended or adjusted under 35 U.S.C. 154(b) by 281 days.

(21) Appl. No.: 13/974,089

(22) Filed: Aug. 23, 2013

(65) Prior Publication Data

US 2015/0054440 A1 Feb. 26, 2015

(51) Int. Cl.
*G05B 11/28* (2006.01)
*H02P 6/08* (2016.01)

(52) U.S. Cl.
CPC .................................. *H02P 6/08* (2013.01)

(58) Field of Classification Search
CPC ................ G05B 11/28; G05B 2219/42237; H02P 7/29
USPC ............. 318/599, 811, 461, 629, 632
See application file for complete search history.

(56) References Cited

U.S. PATENT DOCUMENTS

| 6,845,020 | B2 * | 1/2005 | Deng | H02J 7/345 363/37 |
| 7,612,511 | B2 * | 11/2009 | Youkai | H02P 7/29 318/400.24 |
| 8,036,518 | B2 * | 10/2011 | Chiu | H02P 7/285 318/400.13 |
| 2004/0056627 | A1 * | 3/2004 | Grasso | H02M 7/53875 318/609 |

* cited by examiner

*Primary Examiner* — Rina Duda
(74) *Attorney, Agent, or Firm* — Fasth Law Offices; Rolf Fasth (57) ABSTRACT

The method is for making a brushless direct-current (DC) motor quieter. A predetermined high frequency pulse width modulated (PWM) signal is generated. The PWM signal is sent to a first filter. The first filter truncates the PWM signal to provide the PWM signal with a rise time. The rise time allows transistors connected thereto to open smoothly. A second filter is provided that has a non-polarized capacitor. In a coil switching process, the non-polarized capacitor operates as a voltage or current absorption circuit between driving transistors. The coil switching process creates transient energy of voltage transients. The non-polarized capacitor absorbs the transient energy.

8 Claims, 7 Drawing Sheets

METHOD FOR MAKING A MOTOR QUIETER

TECHNICAL FIELD

The present invention pertains to a method for making a motor quieter such as a brushless direct current motor.

BACKGROUND AND SUMMARY OF INVENTION

Brushless fans are utilized in for instance computers, desktop fans, bathroom fans, and ventilation fans, and the like, because they are not as noisy as those operated by brushes. Nevertheless, brushless fan motors when operated, and when the stator energized electro-magnetic coils change polarization, an unwanted clicking or snapping noise can be heard particularly when the revolving fan blades do not override the clicking noise made by the fan motor. It is sometimes important that ventilation fans are as quiet as possible and the clicking noise should therefore be suppressed to avoid the noise problem.

A brushless fan motor can be driven by direct current (DC) by feeding DC to driver transistors through which the coils are energized. One object of the present invention is to provide a brushless DC motor, which reduces or suppresses the clicking/snapping noise produced when the motor switches its magnetic poles during operation. One important feature of the present invention is the concept of controlling the revolutions per minute (rpm) of the motor through pulse width modulated (PWM) signals when switching transistors and the controlling electronics are integrated inside the motor. The correct timing of the switching of the transistors may be accomplished by using a magnetic sensor, as described in detail below. For example, the on-time of the duty cycle of the pulsating PWM signal may be reduced to reduce the energy/voltage that in turn reduces the rpm of the motor. Thus, when a motor is not controlled through PWM signals, the motor obtains the rpm provided by the voltage when the magnetic circuit alters windings. When the rpm of the motor is only controlled by the variation of the voltage, the motor becomes weak when operating at a low rpm. The control of the rpm with the rpm feedback signal of the present invention makes the motor strong even at a low rpm. A first filter or pulse truncating device is used to truncate the up going flank of the pulsating PWM signals to softly or gradually open a first transistor. The smooth opening of the driving transistor reduces the noise from the stator coils during the switching on or turning-on process. The first filter ensures that the PWM pulses have a rise time as a result of the truncation, which allows the transistors to open smoothly. To clarify, the first filter is not used to filter out the PWM pulses but is used to suppress undesirable noise by slowing down the rise time of the PWM pulses so that the transistors open more smoothly. It was surprisingly discovered that a very rapid opening of the transistors creates an undesirable clicking noise at the coil and that this clicking noise can be suppressed by truncating the PWM pulses to include a soft rise time which, in turn, permits the transistors to open more slowly to avoid the clicking noise from the coils. A transistor is similar to a water faucet in that if it is opened gradually or smoothly then this avoids the undesirable pressure peaks which cause the banging noise in the water pipe. In this way, the transistors of the present invention are gradually or slowly opened for each PWM pulse coming to the transistor gate by truncating the PWM pulses with a rise time which then allows the transistors to open up a bit slower. It should be understood that the words "gradually" and "slowly" are relative terms and merely mean that the transistors open more slowly compared to how the transistors would open if the PWM pulse had not been truncated. The opening of the transistors is still a fast process since they open in micro- or nano-seconds depending upon the frequency of the PWM signal.

Rapid openings of the transistors, i.e. when the PWM pulses are not truncated, results in the sudden flow of current through the stator windings, which creates the undesirable clicking noise in the stator windings of the coil. By making the current-increase into the stator windings more gradual or slower, the current-increase is somewhat longer so there is enough time to start up the creation of magnetic fields in the stator without also creating the undesirable clicking sound. When the PWM pulses are truncated, the current-increase is still very fast, but slightly slower than if only the inductance limits the increasing of the current. If only the coil inductance is used to limit the increase of the current, then the current rushes into the coil too fast and causes the undesirable clicking noise in the stator windings. In general, the coil inductance resists rapid changes of the current and the level of the resistance partly depends on the coil inductance. In the present invention, it is desirable to slow down the current increase through the coils more than what can be accomplished by merely relying on the slowdown caused by coil inductance.

A second filter or transient suppressor has a non-polarized capacitor that may be used to suppress noise caused by transients induced in the stator windings when the current is interrupted by a switch of transistors as a result of the PWM signal being sent into the second transistor instead of into the first transistor. A magnetic sensor may be used to sense when the direction of the magnetic field is switched at a fixed position relative to the stator so that it may be determined which transistor should be activated. In other words, the signal from the magnetic sensor may be mixed with the PWM signal so that the PWM signal is sent to the correct transistor at the right moment. One important feature of using non-polarized capacitor is that the noise from transients is suppressed and absorbed by electrolyte in the capacitor without creating any counter-acting force. Preferably, the turning-off of the first transistor should occur quickly so that the current-flow is quickly interrupted and so that the second transistor can draw current flow in the opposite direction. In a way, the electrolyte of the non-polarized capacitor absorbs the transient energy from the first winding when the current to the first transistor is abruptly turned off. When the second transistor starts conducting at the same moment the first transistor stops conducting, then the polarity of the non-polarized capacitor is switched and the capacitor charge changes polarity.

The acceptable level of the voltage transients may be set by using diodes and zener-diodes. It was surprisingly discovered that the second filter may thus be used to reduce the transient noise from the winding when the transistors are switched. The use of the first and second filters to reduce the noise level from the motor during operation is particularly important when the rpm of the motor is relatively low so that the noise level from the motor is louder than the noise level from the rotating fan blades. The noise reducing features of the two filters may, of course, be used although the noise from the rotating fan blades exceeds that of the operating motor.

Preferably, the direct current motor of the present invention has a stator with at least four poles constituted by at least four teeth/arms. Each tooth has two electromagnetic coils making up a magnetic north and south-pole when energized with current-flow in the opposite direction each time. The motor should have one rotor constituted by at least two static magnetic north poles and two magnetic south poles. The motor of the present invention may have at least one of a central processing, or an electronic circuit unit that may be used to generate the PWM signal at a frequency range that is difficult to hear by a human ear. Preferably, the signal is adapted to be transmitted as a first input signal to a double gate function performing two AND gate functions so that each provides a PWM signal to each one of the two coil driving transistors in order to magnetize the coils in the four stator poles as north and south electromagnetic poles, respectively. Preferably, the stator thus has four poles that are wound so that every other winding is alternatingly wound in an opposite direction. The winding arrangement includes two parallel windings. This means that when current flows through one of the windings two south and two north poles are formed and when the current flows in the other winding all four poles change magnetic polarity so that north becomes south and south becomes north. The AND function gates are, preferably, adapted to receive a second signal activated by a sensor that measures a change in polarization of the rotors magnetic field in relation to the stator so that the AND function gates send the PWM signal to the driving transistors at the right time. The current through the coils may be determined by the duty cycle of the PWM signal and the power voltage to the windings and this determines the power of the created magnetic field in the stator poles. The PWM signal is, preferably, adapted to be received by at least two driving transistors so that each transistor may receive the PWM modulated signal from each of the AND gates. In this way, each driving transistor may receive an alternated modulated signal, based on the position of the magnetic field of the rotors to energize the coils into a north and south-pole at the right moment, respectively and based on the alternation of the magnetic field of the rotors. The driving transistors drive the coils every second time and alternate the current direction through the coils. Preferably, the first filter is connected to the gates of the driving transistors to ground. The time constant of the first filter may be determined by the frequency of the PWM signal. In this way, the first filter may be designed to open the transistors softly/smoothly. As indicated above, this ensures that the PWM pulses have a rise time which allows the transistors opens smoothly. The average current through the transistors decreases for each PWM pulse with increasing filter time. The second filter is, preferably, connected between the wire coils which have at least one capacitor that creates a non-polarized electrolyte which may be used to suppress the snapping sound from the motor when the transistors open up or close i.e. when the current in the stator coil is switched from one transistor to another transistor.

In one embodiment, the non-polarized capacitor is constituted by two serial connected electrolytic capacitors with altered polarity making up the second filter. Another embodiment provides that there is a ceramic capacitor connected in parallel included in the second filter.

Another embodiment provides that the zener diode is connected over each of the coil windings in series with a diode mounted in a reverse direction to suppress voltage transients in the zener direction so that the transients are limited to the level of the zener voltage plus the forward voltage drop of the diode. In yet another embodiment, the PWM signal is generated and sent from the central processing unit or a PWM circuit. Still yet another embodiment provides that the AND function gates are provided with the signal from the magnetic field sensor itself. The AND gate function can also be integrated inside a CPU.

Further one embodiment provides that a predetermined higher voltage output is utilized in a switch function to disconnect the second filter as soon as the noise from the motors load overrides the noise from the motor itself. This higher voltage across the zener diode plus the diode can be used to power up a circuitry that can be used to disconnect the capacitors in the second filter with N-FET transistors when the noise level of the fan blades is so loud that the second filter is not needed since the noise from the fan blades is louder than any noise from the coils. This circuit may be controlled by a control signal from the CPU or the electronic circuit to control when it should connect or disconnect the capacitor based upon the rpm of the motor.

This higher voltage can provide a circuit with driving voltage so that N-FET transistors can work as an analog switch which may be used to disconnect the capacitors in the second filter when the noise level of the fan blades, as determined by the rpm of the motor, is so high that the filter does not need to suppress the clicking noise. In this way, a transistor can cut off the second filter through a signal from the microcontroller or the electronic circuit. It is important to distinguish these transistors from the other driving transistors that are in operative engagement with the windings.

A still further embodiment provides that an input signal is sent to the central processing unit or an electronic circuit through the sensor determining at which rpm the motor is operating. The sensor thus determines how fast the motor rotates but it does not necessarily determine at what rpm the motor should rotate. Preferably, this sensor provides information about when the magnetic field in the rotor is changed and the sensor is positioned in a fixed place relative to the stator. This sensor may have a built-in complementary output that is connected to the inputs at each AND gates and they may be used to send the PWM signals to the coil driving transistors when the magnetic sensor senses a north or south magnetic field. This means that if the sensor senses a south magnetic field, one AND gate opens up and sends the PWM signal to its driving transistor. If the sensor senses a north magnetic field, the other AND gate opens up and sends the PWM signal to the second driving transistor. It is to be understood that there are different ways of generating the PWM signal. For example, if separate AND gates are used, the CPU or separate electronics generates the PWM signal that is sent to the AND gates where it is AND connected together with signals from the magnetic sensor. If the signals from the magnetic sensor are sent directly to the CPU and the AND function is integrated into the software of the CPU, the CPU may generate the PWM signals and send them directly to the correct transistor. Preferably, the AND gate is set up so that when the AND gate has two input gates and both receive signals, the signal received in the first input gate is passed through the output gate of the AND gate. In other words, if the AND gate only receives a PWM signal on the input gate then nothing is passed through to the output gate. However, when the input gate receives the PWM signal and the second input gate receives the signal from the magnetic sensor, then the AND gate opens the output gate so that the PWM signal may pass through the output gate of the AND gate i.e. as long as the magnetic sensor senses the magnetic field and generates the signal to the second input gate of the AND gate. It is also possible to use the pulses from the magnetic sensor to determine the rpm of the motor and when the rpm is known it is possible to adjust the PWM signal to a desirable rpm by changing the duty cycle of the PWM pulse to increase or reduce the rpm of the motor. This embodiment provides that the motor may be controlled through revolution feedback control with this sensor as an RPM input signal.

In summary, the method of the present invention is for making the brushless direct current (DC) motor quieter. The predetermined high frequency pulse width modulated (PWM) signal is generated. The PWM signal is sent to a first filter. The first filter truncates the PWM signal to provide the PWM signal with a longer rise time. The rise time allows transistors connected thereto to open smoothly. A second filter is provided that has a non-polarized capacitor. In a coil switching process, the non-polarized capacitor operates as a voltage or current absorption circuit between driving transistors. The coil switching process creates transient energy of voltage transients. The non-polarized capacitor absorbs the transient energy.

More particularly, the PWM signal is generated through at least one of a central processing unit, or an electronic circuit. The PWM signal is transmitted as a first input signal to an AND gate function. The AND gate function performs an AND gate function with the PWM signal and the signal from the magnetic field sensor. Each AND function gate provides an output signal to each one of the coil driving transistors to magnetize coils as north and south electromagnetic poles, respectively. A second input signal is sent to the AND gates, and that signal is activated by the magnetic field sensor when a change in the polarization of a magnetic field of rotors is measured the AND gate opens and puts out the PWM signal. It should be understood that the use of four poles for the motor is merely an illustrative example and that it is possible to use more or fewer poles if necessary.

The opening of the output gate of the AND gate occurs when the AND gate receives an input signal from the magnetic field sensor and the PWM signal as an input signal at the other input gate of the AND gate. Preferably, at least two driving transistors receive the PWM signal. Each driving transistor receives the PWM signal from one of the AND function gates. Each transistor receives a PWM signal, based on the polarity of the magnetic field of the rotors at the sensor position to energize the coils into a north and south magnetic pole, respectively, based on alternation of the magnetic field of the rotors. The driving transistors drive the coils every second time alternating a current direction and current strength through the coils. The first filter is, preferably, connected between the outputs of the AND gates and the gates of the driving transistors. A time constant of the first filter may be determined by a frequency of the PWM signal. The first filter is adapted to open the driving transistors to ensure that pulses of the PWM signal have a rise time which allows the driving transistors to opens smoothly. The average current through the driving transistors decreases with increasing filter time of the first filter. The second filter is, preferably, connected between the coils. The second filter has a capacitor that suppresses a snapping sound from the motor when the driving transistors open up and stop conducting current.

Preferably, the capacitor is a non-polarized electrolytic capacitor. The capacitor may be provided as two serial connected electrolytic capacitors with the same polarity connected to each other. For example, the plus poles of the capacitors are connected together or the minus poles of the capacitors are connected together to create a non-polarized capacitor. The other sides of the serial-connected capacitors are connected to the coils. This connection may be illustrated as −++− or +−−+.

The capacitor may be connected in parallel with a ceramic capacitor. Also, the zener diode may be connected over each of the coil windings in series with a diode mounted in reverse direction to suppress voltage transients in the zener direction and limiting the transients to a level of a voltage of the zener diode plus a forward voltage drop of the diode.

The method of the present invention for making a motor quieter includes the step of generating a predetermined high frequency pulse width modulated (PWM) signal. The PWM signal is sent a first filter. The first filter truncates the PWM signal to provide the PWM signal with a rise time. The rise time allows driving transistors connected to the first filter to open smoothly. The second filter has a non-polarized capacitor. In a coil switching process, the non-polarized capacitor operates as a voltage and/or current absorption circuit between the driving transistors. The coil switching process creates transient energy of voltage transients. The non-polarized capacitor absorbs the transient energy. A CPU creates and sends the PWM signal. A magnetic sensor is provided that is moved to permit the CPU to delay sending the PWM signal. The CPU is provided with software to permit the CPU to delay sending the PWM signal. The current and voltage of the motor is measured to determine a motor load. A motor effect of the motor is determined based on the current and voltage of the motor. An efficiency of the motor is improved by moving a switching point for activating the stator windings. The PWM signal is used to control revolutions per minute (rpm) of the motor. The magnetic sensor sends a signal to a first input of an AND gate and a CPU sending the PWM signal to a second input of the AND gate. The non-polarized capacitor suppresses noise from the voltage transients. Zener diodes are used to limit the voltage transients. The CPU disconnects the non-polarized capacitor when revolutions per minute (rpm) of the motor are below a threshold value.

The method is directed to making a direct current motor quieter by generating a predetermined high frequency pulse width modulated (PWM) signal through at least one of a central processing unit, or an electronic circuit, transmitting the PWM signal as a first input signal to a double gate function. The double gate function performs two AND gate functions at AND function gates. Each AND function gate provides a signal to each one of coil driving transistors to magnetize coils as north and south electromagnetic poles, respectively. A second signal, that is activated by a magnetic field sensor, is sent to the AND function gates. A change in polarization of a magnetic field of rotors is measured. A magnetic field sensor opens the AND function gates and outputs the PWM signal. At least two driving transistors receive the PWM signal. Each driving transistor receives the PWM signal from one of the AND function. Each transistor receives an alternated modulated signal, based on the magnetic field of the rotors to energize the coils into a north and south magnetic pole, respectively, based on alternation of the magnetic field of the rotors. The driving transistors drive the coils every second time alternating a current direction and current strength through the coils. A first filter is connected to the AND function gates of the driving transistors. A time constant of the first filter is determined by a frequency of the PWM signal. The first filter is adapted to open the driving transistors and ensures that pulses of the PWM have a rise time which allows the driving transistors to opens smoothly. The average current through the driving transistors decreases with increasing filter time of the first filter. A second filter is connected between the coils. The second filter has a capacitor. The capacitor suppresses a snapping sound from the motor when the driving transistors open up and close while drawing current through the coils to ground. The capacitor is provided as a non-polarized electrolytic capacitor. The capacitor is connected in parallel with a ceramic capacitor. A zener diode is connected over each of the coil windings in series with a diode mounted in reverse direction to suppress voltage transients in the zener direction and limits the transients to a level of a voltage of the zener diode plus a forward voltage drop of the diode. The central processing unit sends the second signal to the AND function gates. The sensor sends a signal to the CPU about a position of the rotor. The CPU creates the PWM signal and sends the PWM signal. The motor is controlled through a revolution feedback control.

The method for making a motor quieter includes the step of sending a pulse width modulated (PWM) signal to a first transistor. The first transistor conducts current into a stator winding. A second transistor is switched to by sending the PWM signal to the second transistor instead to the first transistor. The first transistor terminates conduction of the current into the stator winding and induces transients in the stator winding. A capacitor suppresses the transients induced by the first transistor. A non-polarized electrolyte capacitor is used to suppress noise from transients and a diode to set a voltage limit of the capacitor. A zener diode sets a voltage limit of the non-polarized electrolyte capacitor.

The method for making a motor quieter includes the step of a first transistor conducting current in a first direction through a stator winding and a capacitor. The first transistor is deactivated and a second transistor is activated. The second transistor conducts current in a second direction through the stator winding and the capacitor. The capacitor absorbs transient energy from the current created in a time period between deactivation of the first transistor and activation of the second transistor. A first end of the capacitor is filled with transient energy in the first direction while emptying previously stored transient energy out through a second end of the capacitor. The previously stored transient energy is emptied in the first direction.

BRIEF DESCRIPTION OF THE DRAWINGS

Henceforth, reference is had to the accompanying drawings throughout the present description for a better understanding of the present inventions embodiments, and given examples, wherein.

DETAILED DESCRIPTION OF PREFERRED EMBODIMENTS

The present invention relates to a brushless DC motor made up of a stator with a number of windings which are magnetized by a current flowing through the different windings. It is to be understood that the invention is not limited to brushless DC motors and that any suitable type of motor may be used. The brushless DC motor is merely used as an illustrative example. The current at least partially depends on the windings number of turns, the area of the wire, and the applied PWM signal. Preferably, the stator windings should be wound so that the required power can be obtained with the high PWM frequency. Because the inductance opposes fast current changes, the windings should have a sufficiently low inductance so that desired current level can be reached. In other words, the stator should be wound in such a way that the desired or required current that is to be drawn through the windings can be accomplished at the PWM frequency used. If the inductance is too high, it is not possible to draw the required current by using the PWM signal because the inductance resists rapid changes of the current.

Preferably, the motor rotor is constituted by a magnetic ring which surrounds the stator with a number of magnetic fields, which alter polarity, that have an equal number of magnetic poles as the stator. If the stator has four windings (poles) and the rotor has four magnetic fields, and the windings of the stator are magnetized alternately in different directions of the flow of the current, the rotor will rotate as a result of the magnetic field provided by the stator.

In order to be able to alternate between the different windings at the correct moment, a sensor is utilized which senses when the magnetic field of the rotor changes direction. The sensor is preferably attached in a manner that it senses this change at the correct position relative to the windings of the stator. With the aid of the sensor, the current is alternated through the windings of the stator, so that the poles in the stator pull the rotor magnetic field towards it, and thus forcing the rotor to follow the magnetic field induced in the stator by changing/alternating the direction of the current through the windings.

By varying the strength of the current through the windings, the force of the magnetic field induced in the stator may be controlled, and the higher the strength of the current, the stronger the pulling force of the magnetic field on the rotor becomes and the rotor rotates faster. To control how fast the motor rotates its rotor, it is essential to control the current flowing through the windings. This can be accomplished by varying the voltage applied, or by utilizing the pulse width modulated (PWM) signal which activates transistors that draws current through the windings of the stator with a frequency where the pulse ratio is altered between ON time, and OFF time to alter the speed of the rotor. Preferably, the PWM signal should be at a frequency above 16,000 Hz or higher so that it is impossible or very difficult for a human to hear. Lower frequency ranges may also be used as needed.

Each time current flows through the stator windings, the stator is magnetized with a specific magnetic polarity determined by the direction of the current. The current can flow in two directions through the windings. This may be accomplished by wiring the stator with double cupper wire, which then is connected such as if current is pulled through one of the windings a magnetic field of a specific polarity, south or north, is created at the stator poles, and if current is pulled in the opposite direction, an opposite polarity of the magnetic field is induced in poles at the stator.

This makes it possible to send current each second time through one or the other winding with the aid of the sensor sensing the magnetic field of the rotor, and thus current through the stator coils creating rotation of the rotor. In order to succeed, the current through the coil of the stator should be quickly suppressed from to flow further when the windings are altered. The winding in the stator acts as an inductance, which prevents quick changes of current through itself, and if a coil is quickly cut off from power a voltage transient occurs, i.e. the current tries to maintain its direction. This voltage transient can be very high, and thus damage the electronics inside the motor and electronics associated with the motor. By positioning a freewheeling diode over the coil, the current will rotate through the diode up to the positive potential of the circuit until it has rung out. This freewheeling current magnetizes the stator winding, which was just cut off, a while after a change of winding, which provides a retarding effect on the motor, and a certain increase of heat in the windings. Hence, it is often not possible to quench this transient by a freewheeling diode. If a zener diode is attached together with the freewheeling diode so that the voltage above a predetermined level freewheels, an enhancement is achieved, but there still remains a force. This remaining lower force partly depends on the zener voltage. A higher voltage on the zener-diode lowers the counterforce that tries to hinder the rotation of the rotor of the motor. In general, the higher the voltage of the zener diodes the lower the remaining power/force is.

It was also surprisingly discovered that by attaching an un-polarized electrolyte capacitor between each winding, the sound from the transients may be suppressed or eliminated. It is important to suppress the transients because they create an electric ticking inside the motor due to the energy that has to be diverted when altering between the windings in the motor. This electric noise may be an insignificant problem when a fan is operated at a high speed because the noise from the fan itself overrides the electrical noise. However, when the speed of the fan operates at a low speed (so that the fan blades create no or very insignificant sound/noise) then it becomes more important to suppress or eliminate the electrical noise. More particularly, when the fan motor operates at a high speed, the sound from the fan blades is louder than the sound from the fan motor but when the fan motor operates at a low speed then the sound from the fan blades is not louder than the ticking sound from the motor during operation. It is therefore particularly desirable to suppress or reduce the noise from the electrical motor and other components in the circuitry when the fan motor operates at a low speed.

The present invention provides a method for effectively removing or suppressing the electrical noise, and for enabling the brushless DC motor to operate electrically in a quiet way, which is important when the motor operates at low revolutions. Such a motor may, for example, be used in household electrical appliances such as desktop fans, computers, bathroom fans, ventilation fans, and the like, which should be as quite as possible, and controllable regarding their revolutions to be altered when needed due to cooling/ventilation and other purposes. The motor of the present invention can be utilized in other appliances/apparatuses particularly where it is important that the motor operates quietly even at low speed without creating any undesirable electrical noise. A solution to the electric noise problem according to the present invention involves a double wound stator, i.e. a stator with two wires which are simultaneously wound on the poles of the stators all poles. When the current through these windings is altered, every second pole then creates a rotating magnetic field in the stator that pulls the rotor.

To control these windings two transistors may be used which are able to connect each one winding to ground. The other end of the winding may be connected to a joint point. The joint point may be connected to the positive circuit terminal potential in such a manner that the driving transistors can pull current through the winding from the positive terminal to the negative through each winding, and thereafter ensure that the transistors are controlled by a sensor, which senses the magnetic field of the rotor, and transmits its signals to the input of the AND gate and by using the high frequency PWM signal to the other input on the AND gate. The output of the AND gates is, preferably, connected to each transistor via the first filter. This makes it possible to control the current through the windings by using the duty cycle of the PWM signals.

This solution can also be used with a reverse coupling where the common point of the coils is connected to GND and the driving transistors are connected to the positive voltage and then to the coils. This type of connection is slightly more complicated to use but is fully possible. The AND gate function can also be created inside a micro-controller and in such cases the sensor signals are connected to the micro-controller and then the micro-controller sends out the PWM signal to the driver transistors at the right time based on the sensor signals received from the magnetic sensor.

When these transistors, such as conventional field effect transistors (N-FET), are activated they are to open smoothly, i.e. not opened too fast to prevent electrically created noise in the motor. This smooth opening of the transistor is accomplished through an R/C filter, referred to as a first filter or truncating device 34 in FIGS. 1-2 where the resistance R connects to the gate of the transistor, and the capacitor C is attached to ground/negative potential. The first filter ensures that the pulses have a rise time which allows the transistors to open smoothly. More particularly, an N-FET transistor begins to open at a certain voltage level and is fully open at a higher level. If the PWM signal is used to control the gate at the transistor and the PWM signal is truncated and thus has a certain rise time, then this rise time permits the transistor to open from being fully closed to fully open during the rise time of the PWM signal. When the transistor is closed a diode is, preferably, attached over the resistance R so that the capacitor C is quickly drained and then quickly stops the current flow through the transistor. With this type of filter solution, it is possible to control the transistors by using the PWM signal, thus being able to vary the current flowing through the windings, and thus the rotation speed of the rotor of the motor. The transistors may thus be alternated with the PWM signal to at least two different windings by the aid of the sensor, which detects the magnetic field from the rotor, and the current through the windings is controlled by the PWM signal. More particularly, the bipolar electrolyte capacitor works in the sense that when the transistors switch then the side that was positively charged is connected to GND via the second transistor that just began to conduct current while at the same moment the first transistor stops conducting current.

The first transistor, that just ended leading current, releases its capacitor side from GND and this side of the bipolar electrolyte capacitor then goes up to a voltage limit as determined by the zener diode. In other words, the zener diode may be used to set and limit the voltage level the bipolar electrolyte capacitor is permitted to reach. In this way, the voltage transients may be reduced caused by a transistor that has just ended leading current. The current flows into the bipolar electrolyte capacitor and starts to fill this side of the capacitor with a polarity that is opposite its previous polarity when the other capacitor side is now connected to GND and then empties the earlier charge through the coil driving transistor which switches the previously positive side of the bipolar electrolyte capacitor to GND.

As mentioned above, the PWM signal frequency should be above the conventional hearing frequency of a human being, for instance in the range of 16000 Hz and above. The range 16000 Hz should be regarded as a benchmark, and not as an absolute value in the scope of the present invention. It is also possible to use frequency ranges below 16000 Hz but one disadvantage of using a lower frequency range is that humans can hear the signal. Preferably, N-FET transistors are used but it is also possible to use other types of suitable transistors.

Figure 1:
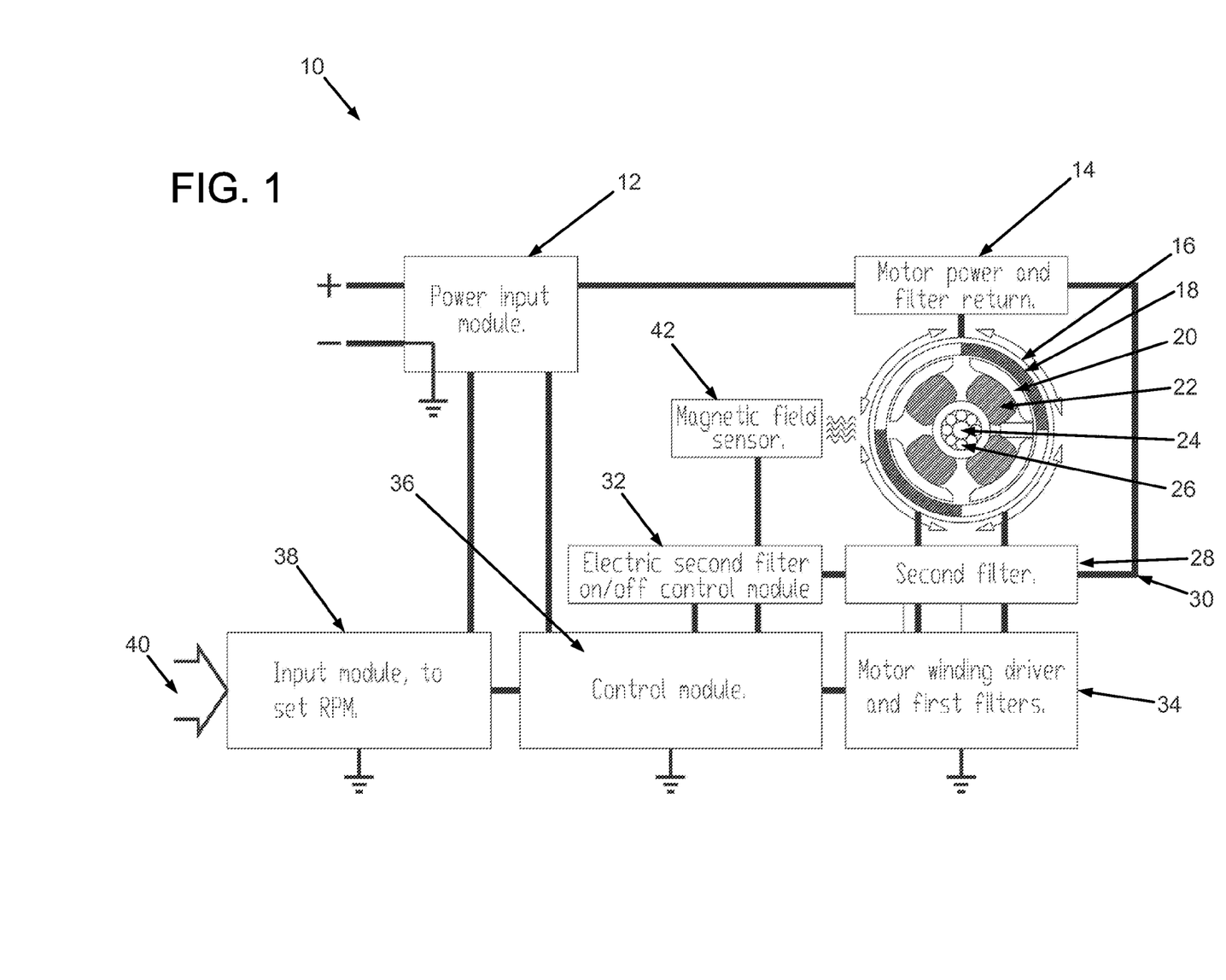
FIG. 1 schematically illustrates a block diagram of the DC motor in accordance with the present invention.
Figure 2:
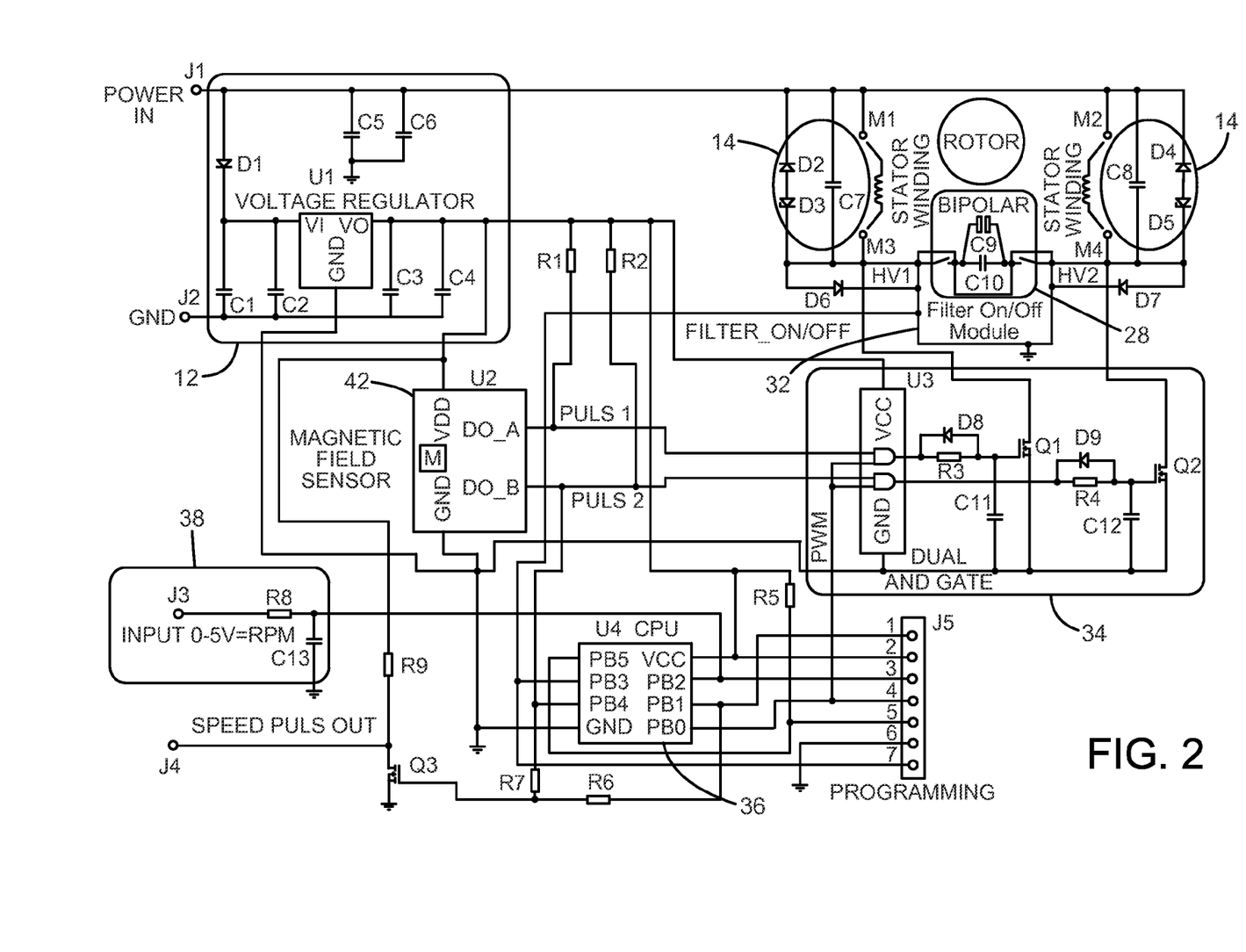
FIG. 2 illustrates a first embodiment of an electric circuit diagram utilized to drive a motor in accordance with the present invention.

As the transistors are alternated switched, the problem of suppressing the electrical noise created when the transistor stops conducting current is solved by attaching a non-polarized electrolytic capacitor between the windings, referred to as a second filter 28 in FIGS. 1-2, and two zener diodes, which limit the voltage transients to a predetermined level.

The voltage level of the zener diode plus the diode voltage should not exceed the voltage level that the electronic-circuits integrated and non-polarized electrolytic capacitor in the motor can handle. If the maximum voltage level of the motor circuits is exceeded there is a risk that the transients may destroy these circuits. The zener voltage level is determined by what voltage the other involved components and/or circuits can withstand. Alternatively, the non-polarized electrolytic capacitor may be constituted by two serial connected electrolytic capacitors with altered polarity to make up the second filter. In other words, it is possible to use a conventional electrolyte capacitor and connect it so that either plus-to-plus or minus-to-minus is connected together and the other sides are connected to the windings which may be illustrated as −++− or +−−+. This is one way of creating the non-polarized capacitor.

The non-polarized capacitor may be loaded by the energy from the coil that is just disconnected from GND through the driving transistor, when the other transistor has just connected its side of the non-polarized capacitor to GND/minus potential, and when there again is a switch between transistors. Preferably, the other side of the non-polarized capacitor is connected to GND and then the previously charged side is emptied to GND, and the other side of the non-polarized capacitor is loaded with the energy from the momentarily detached coil. The non-polarized capacitor can also be connected in parallel with a ceramic capacitor to further enhance the effect of this connection and also to manage the EMI/EMC problem. Also, an up-transformed voltage occurs over the zener-diode and diode combination that limits the voltage transients. This higher voltage across the zener diode plus the diode can be used for powering up a circuitry that can disconnects the capacitors in the filters when the noise level of the fan blades is so loud that the filter is not needed. The circuit may be controlled by a control signal from the CPU or electronic circuit that in turn controls when it should connect or disconnect the capacitors in the filter based upon the rpm of the motor. One advantage of cutting off the filter capacitors when the rotors rotate fast is that the capacitors reduce the efficiency ratio of the motor somewhat, so when the filter are disconnected the efficiency ratio of the motor increases.

As mentioned above, the CPU may be used to generate and deliver the output PWM signal at a high frequency above for instance 16000 Hz which in its turn is a signal to the double AND gate function internally in the CPU or externally. The PWM signal is, preferably, AND functioned with the signals from the magnetic field sensor which detects the rotors magnetic field. The sensor may be a hall-sensor that has a complementary output. Regarding the expression AND gate function it is introduced to include all circuits that are able to provide an AND function. The AND function can be a function included in the CPU.

This means that the PWM signal, preferably, reaches the coil driving transistors via these AND function gates so that the transistors receive an alternating PWM signal depending on the magnetic polarity and position of the magnetic field of the rotors contra the stator. Moreover, the CPU/electronics has an input for detecting the signal from the magnetic sensor, thus being able to sense how fast the rotor is rotating, and the CPU/electronics is thereby able to control its PWM output to maintain a constant revolution of the motor rotor at a varying load. This control is an important feature of the present invention.

In order for the CPU/electronics to be able to "know" at which speed to operate the motor, it should be fed some type of command. One solution to this problem is to feed the CPU with a voltage controlled signal for instance in the range of 0 to 5V, which means that the motor may keep a certain revolution for instance in one embodiment 500 revolutions/volt input to the CPU, which in this embodiment means a maximum revolution of 2500 revolutions.

By introducing such a solution for revolution control, it is important not to let the motor rotate faster than what it is capable of maximum load. For example, if the motor is capable of rotating at 2500 rpm at maximum load it will rotate faster if the load is decreased, unless the CPU/electronics does not decrease its PWM signal to keep the rotor at 2500 rpm.

The CPU/electronic circuit may also receive a signal from the sensor, which detects the magnetic field of the rotor which signal is utilized to create a regulation loop to keep the speed/revolutions of the rotor constant at an rpm that is independent of the load. To be able to control the motor there should be a sensor attached, which detects the magnetic field from the rotor, typically a hall-sensor such as the UTC UH277 which may be a Latch-Type Hall Effect sensor with built-in complementary output drivers from UNISONIC TECHNOLOGIES CO., LTD. It can also be a sensor with one output and then the CPU or an external electronics circuit creates a complementary output signal. That signal is connected to the PWM signal in such a manner to provide the PWM signal to the driving transistors during the time the magnetic sensor senses the magnetic field, typically via the AND gate function. If the motor stator is constituted by two windings, two driving transistors are required, which are alternately driven when the pulses from the magnetic sensor which is AND functioned with the PWM signals. The output from the AND gate reaches the driving transistors gate via the first filter. One side of the stator windings is wired to the positive potential, if it has two windings one side of these windings is wired to the positive potential, but they are connected to direct the current in different directions through the windings when their driving transistors open up to GND and current starts to flow through the windings. On the lower side of the windings at the side of the driving transistors the bipolar electrolytic capacitor is connected between the windings, and between the windings in parallel with the capacitor which may be a ceramic capacitor if needed. The zener diode/diode combination is connected as a voltage transient protector circuit in parallel with each winding. The voltage over this zener diode can be varied, but is typically 15 V at 12 V supply voltage. The anode of the zener diodes is connected to an anode on a diode which leads to the supply voltage to prevent the current from going through the zener diodes in the wrong way. In parallel with these zener diodes/diode connections, a ceramic capacitor may be attached with a relatively low value of approximately 100 nF. A voltage over this diode combination is created when the motor is operated. The higher voltage across the zener diode plus the diode (higher than the supply voltage) can be used for powering up an circuitry that can disconnect the capacitors in the second filter with N-FET transistors when the noise level of the fan blades is so loud that the filter is not needed. This circuit is controlled by a control signal from the CPU or electronic circuit that in turn may be used to control when it should connect or disconnect the capacitors in the second filter based upon the rpm of the motor.

The FET transistors, which draw current through the stator windings has the first filter connected to the gates of the transistors so that they can operate smoothly to avoid a clicking/snapping sound from the stator/motor when they operate, the filter time constant is, preferably, determined by the frequency of the PWM signal, and in some cases also by other factors. The current through the transistors decreases with increasing filter time, the shorter the filter time the higher current per PWM pulse, i.e. the transistors open faster.

The undesirable sound/noise filtered in the circuit of the present invention originates from the stator windings, which without a proper control act as speaker coils, and produce a more or less weak ticking sound/noise when they are magnetized by the current, and from the voltage transient as the coil is demagnetized. All the electronics needed can be embedded in the motor which may have or four wires depending on if one signal is utilized for reading the rpm or not. Without reading the rpm, there exists a positive, and negative voltage feeding, and a signal for a determined revolution, or adding the revolution signal rendering in four wire connections. If the motor is controlled by serial data on a data bus, it may have three or four wire connections dependent on if data is only transmitted to the motor or in a duplex communication. Many different types of input signals may be used to control the rpm of the motor. For example, voltage signals, current signals, wireless signals, serial data or any other suitable type of signal may be used.

The PWM signal has at least two functions. One is to switch the driving transistors with a frequency that is preferably difficult to hear by a human, and the other is to determine the current through the stator coils in the motor, and at the same time to also make it possible to control the rpm of the motor.

Concerning the higher voltage received over the zener diodes (higher than the supply voltage), it can be utilized to control a pair of N-FET transistors as analog switches. These require a higher voltage on the gate than at the source connection, which is accomplished by using the higher voltage that occurs over the zener diodes. This voltage is the zener voltage higher than the supply voltage. It is also possible to disconnect the capacitors in the second filter with P-FET transistors, which open at a lower voltage at the gate than at the source. However, these are more expensive and often hard to find with a low on-resistance such as a drain source on-state resistance (RDSon).

It is further appreciated that at least one of a central processing unit or an electronic circuit, is provided with an input signal from the magnetic field sensor to determine at which rpm the motor is operating. This is an input signal that indicates how fast the motor rotates. Moreover, it is possible that the motor is controlled through revolution feedback control with this magnetic field sensor as a feedback of the rpm. It is also possible to control the motor without revolution feedback control. If no feedback control is used, then it is easier to develop the electronics of the motor but the motor drops in revolutions if the load increases. This means that if the motor has an impeller and works as a fan then the revolutions varies with the backpressure, the motor may change its revolution depending on the load of the motor and the motor efficiency. When a motor is controlled through revolution feedback, the motor tries to keep its speed constant as ordered by the input signal. The motor keeps the speed relatively constant as long as the load does not exceed the maximum motor efficiency. Preferably, the motor should be designed for different efficiency depending on the normal power needed for the application.

FIG. 1 depicts a block diagram of the direct current motor 10 of the present invention. The motor 10 with its circuit is illustrated by a power input 12 and a motor power and transient voltage filter return 14. Preferably, the motor has a magnetic ring rotor 18, with a rotor 16 disposed within the motor as well as a stator 20 with its stator windings 22, and a rotor shaft 24, and its bearing 26 for the rotor 16 to be able to rotate. Also depicted is the second filter 28 that is used to suppress noise/sound in accordance with the present invention. Reference numeral 30 is used to depict the voltage protection return path up to filter return 14. FIG. 1 also shows a magnetic sensor 42.

The electric sound/noise on/off control switch 32 may be utilized when for instance a fan noise itself overrides the electrical induced noise from the motor 10. In other words, the switch or control module 32 may be used to turn off the noise reducing functions of the first filter 34 and the second filter 28 when the noise from the fan blades is louder than the noise from the fan motor and other electrical components. One advantage of turning off the filters 28 and 34 is that the efficiency of the fan motor increases. The first filter 34 may include a motor winding driver. A PWM and RPM control module 36 is shown which maybe a CPU or an electronic circuit. Input module 38 for a speed demand can for instance be applied by serial data, voltage or current control. An arrow 40 depicts the input speed demand on the motor, which can be serial in one embodiment controlled by voltage and/or current. FIG. 1 shows one possible embodiment of a motor according to the present invention.

In FIG. 2 one embodiment of an electric circuit diagram is illustrated that is used to drive the motor in accordance with the present invention. FIG. 2 shows a magnetic sensor 42, the power input 12 such as a voltage control, the control module 36 such as a CPU, and the second filter 28. The first filter 34 controls the gates of the two driving transistors Q1 and Q2. Each first filter 34 may be constituted by diodes D8, D9 in parallel with two resistors R3, R4, and capacitors C11, C12 connected from the gate to ground and including the AND gate function as a dual AND gate shown in FIG. 2. Hereby, as mentioned, the first filter opens and closes the transistors in a smooth manner so that the transistors open relatively slowly as a result of the truncated PWM signals, as explained in detail above.

The second filter 28 is, preferably, constituted by a bipolar capacitor C9 in parallel with a ceramic capacitor C10 that may be used to suppress the clicking noise of the motor as a result of the capacitor absorbing the transient energy, as explained in detail above. A voltage protection 14 is shown suppressing voltage transients to a zener voltage level due to the inherent buildup of an induced magnetic field in the stator windings when altering the direction of current through the windings. The voltage protection 14 is constituted by diodes D2, D4 in series with zener diodes D3, D5, in parallel with capacitors C7, C8. Zener diodes D3 and D5 open at a predetermined zener voltage. A higher voltage that is built up over these diodes by the voltage transients is going to the on/off module 32 through D6 and D7 and is utilized to power up a switch function in module 32 to disconnect the second filter 28 when for instance the fan blades (impeller) are rotating so fast that the sound from the rotating fan blades is louder than the clicking noise of the motor itself. The control module 36 may control when to disconnect the capacitors in the filters based upon the rpm of the fan motor.

Figure 3:
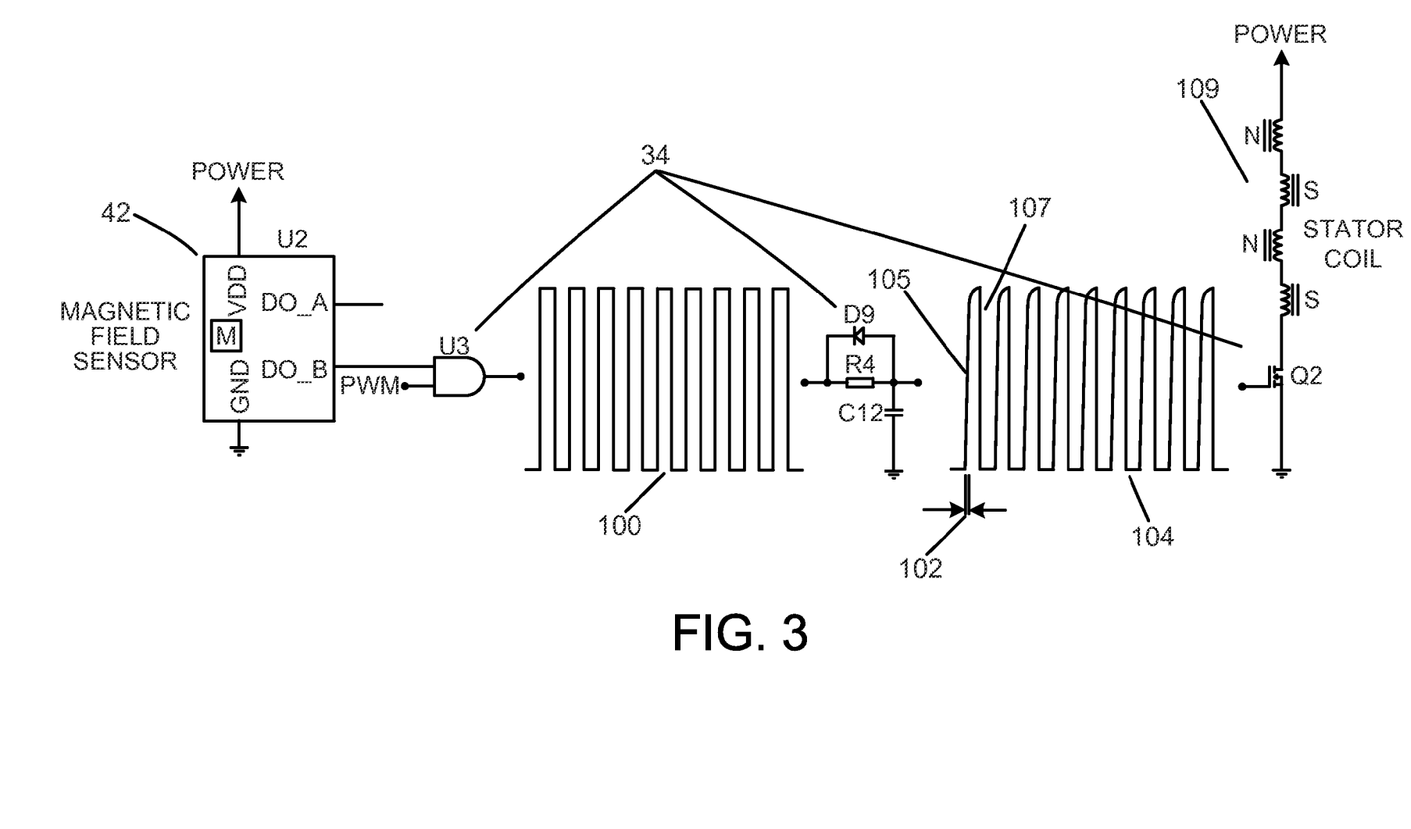
FIG. 3 is a schematic illustration of truncated PWM signals in the first filter in accordance with the present invention.

FIG. 3 is a schematic illustration of how the PWM pulses changes from pulses with tremendously fast rise time to pulses with longer rise time 102 so that the driving transistors open up softly and close fast as a result of the truncated PWM pulses 104. PWM pulses 100 are un-truncated before the pulses pass the first filter 34. More particularly, the magnetic field sensor 42 opens up the AND gate U in the first filter 34 at the right moment and then the PWM signal reaches the R4 and C12 in the first filter 34 that truncates the up-going flank of the PWM signals 104. The diode D9 in filter 34 leads the current from C12 really fast to get a fast off time when the AND gate output goes low. This produces the soft rising PWM pulse 104 that has the truncated flank 105 and a fast falling pulse time 107. The PWM pulse 104 goes to the gate on the driving transistor in the first filter 34 that drives the stator coil 109 in the motor. Equivalent circuits exist for the other coils.

Figure 4:
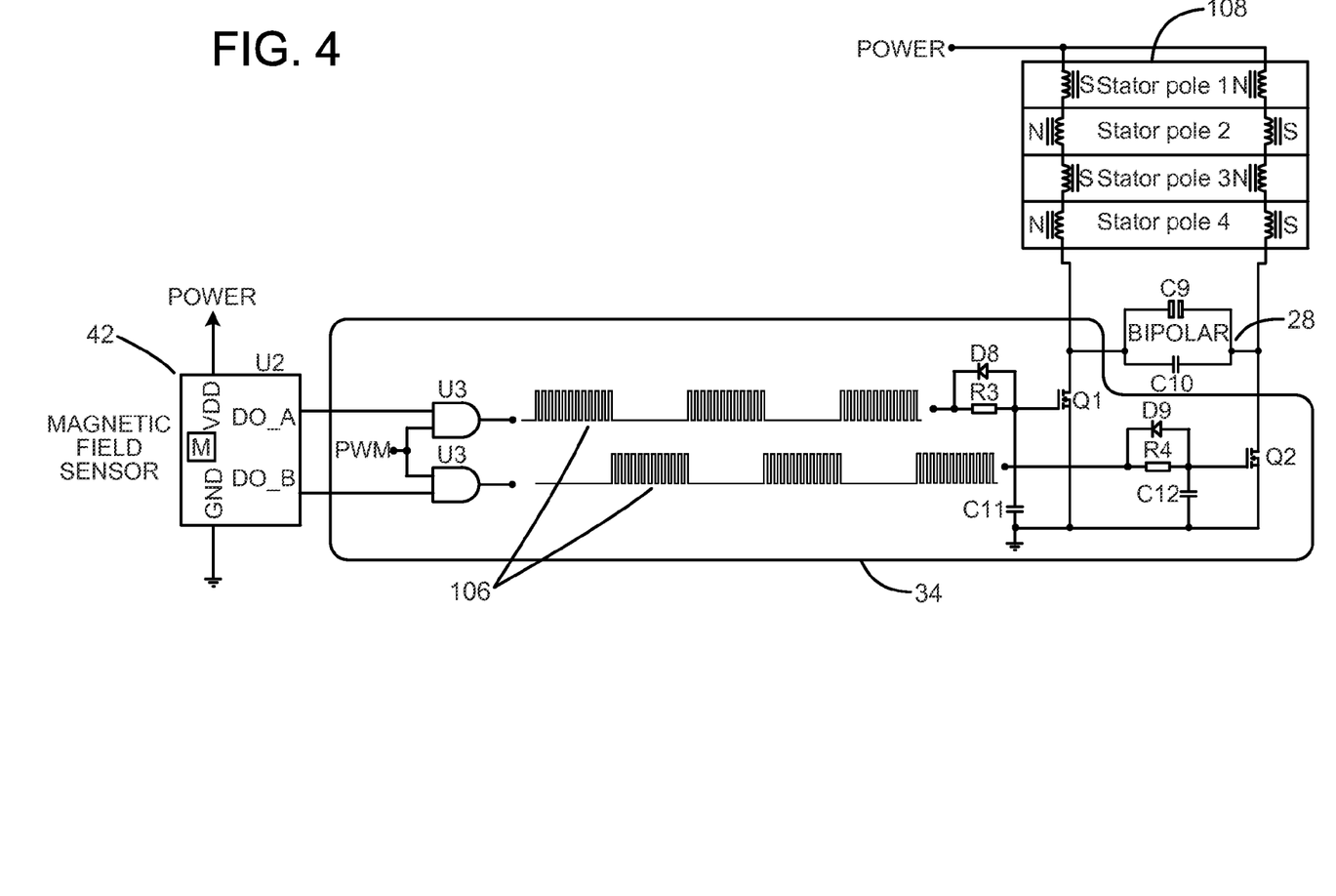
FIG. 4 is a schematic illustration of PWM signals going to the driving transistor in accordance with the present invention.

FIG. 4 is a schematic illustration of how the PWM pulses or bursts 106 go into the driving transistors via the circuits that change the rise time of the PWM pulses. As mentioned earlier, the driving transistors drive each coil placed in the stator poles 108. The coils are wound so that the polarity N and S of the stator poles changes depending upon which transistor Q1 or Q2 conducts current through the coils. In other words, the stator is wound in such a way that the stator poles change their polarity when the transistors Q1 or Q2 conduct current through the stator windings alternatingly.

The current through the coils may be controlled by the duty cycle of the PWM signals. This in turn controls the magnetic force at the stator poles. In this way, the rotational direction and rpm of the motor may be controlled. More particularly, the magnetic sensor 42 opens the AND circuits U3 in the first filter 34 and puts out the PWM signal 106 depending upon the magnetic polarity sensed by the magnetic sensor. The PWM signal 106 is then used to drive the driving transistors Q1 and Q2. The first filter 34 that is used to change the rise time of the PWM signal is associated with the circuits D8, R3, C11 and D9, R4 and C12 before each coil driving transistor Q1 and Q2, respectively. The second filter 28 is associated with the non-polarity electrolytic capacitor C9 connected in parallel with a ceramic capacitor C10. The capacitors are used to suppress the undesirable sound that occurs when the transistors alternatingly conduct current.

Figure 5:
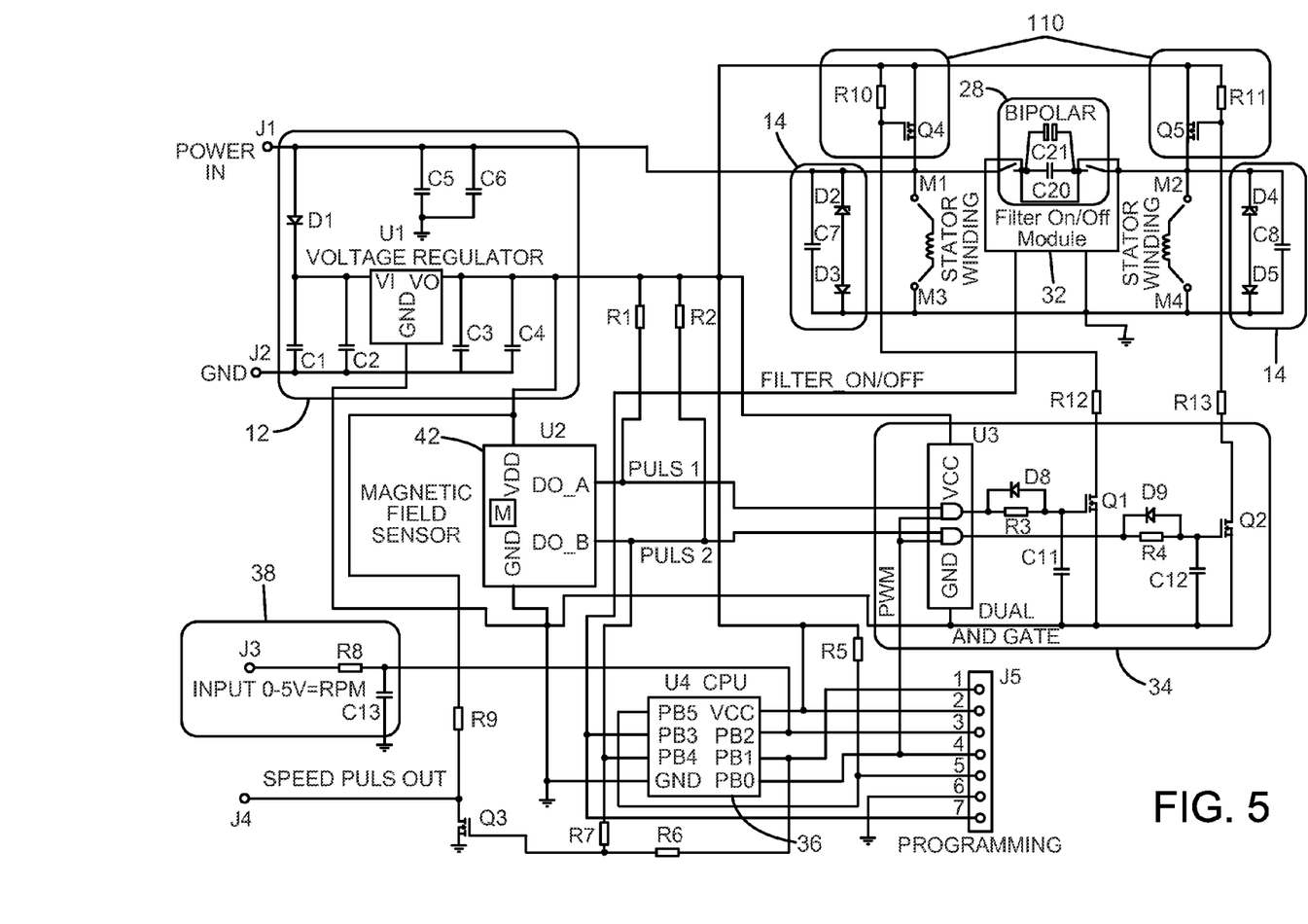
FIG. 5 is a second embodiment of the electric circuit diagram of the present invention.

FIG. 5 is a schematic illustration of a circuit of an alternative embodiment regarding how to conduct current through the windings of the stator. The transistors 110 may be of a P-FET type and they may be controlled by the transistors Q1 and Q2 that drive the coils, as described above. With this design the common connection for the coil is to ground (GND) and the driving transistors conduct current from the plus rail. The voltage transients are negative to GND so in this design there is no higher voltage available to disconnect the non-polarity electrolytic capacitor with. Instead, the disconnection of the capacitors must be solved with a different technic. The conduction of the current from the positive rail may also be done with N-FET transistors but then it is also necessary to use a voltage level shifter for the transistor gate drive. When N-FET transistors are used it is preferable that the PWM signals are operating at a voltage that is higher than the supply voltage such as 5V or higher.

Figure 6:
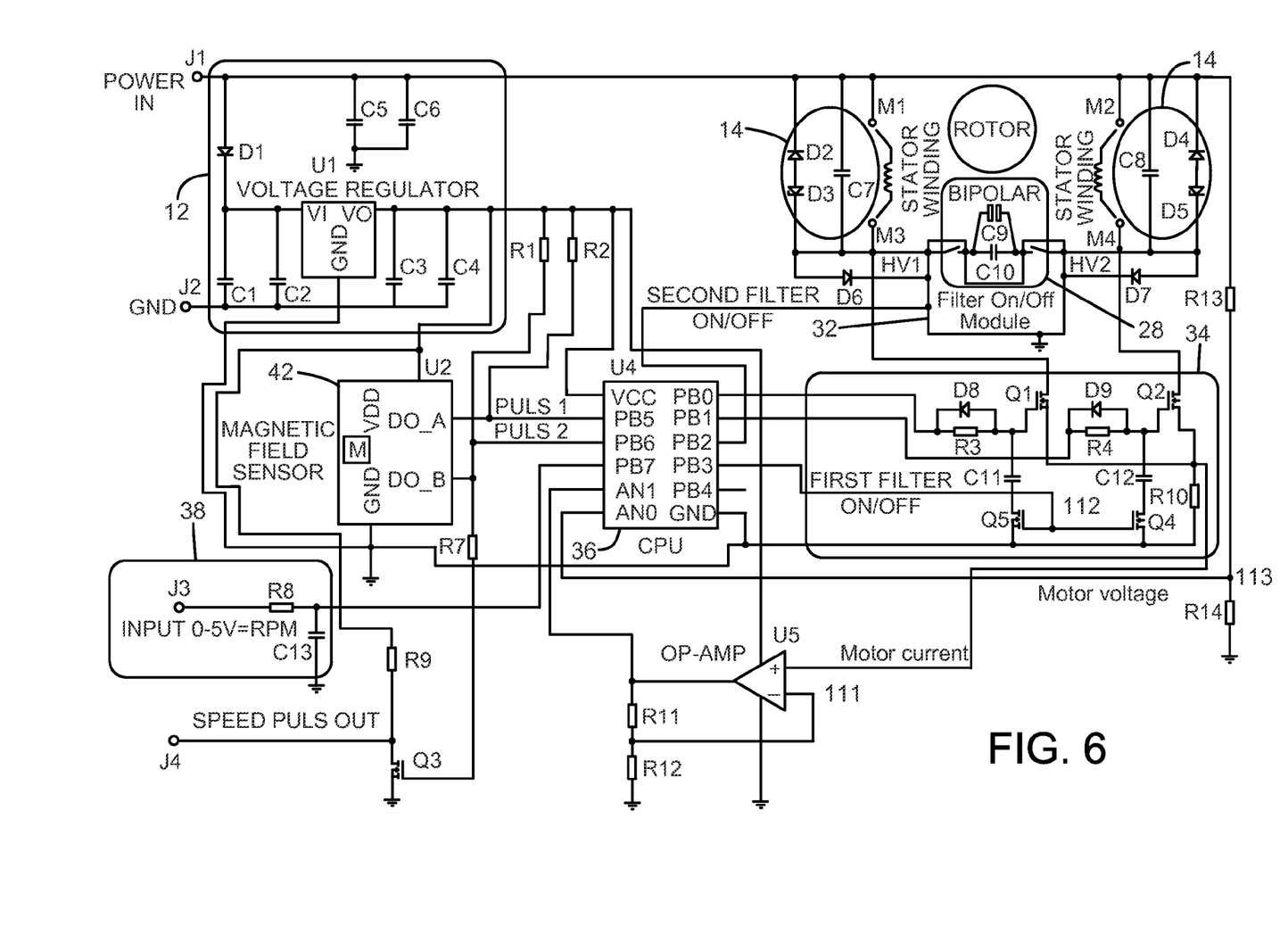
FIG. 6 is a third embodiment of the electric circuit diagram of the present invention.

FIG. 6 is a schematic illustration of a circuit showing a PWM signal that is controlled by a CPU 36 that has an AND functionality integrated therein. The circuit shows how it is possible to measure the current and voltage of the motor power with the CPU 36 and how to control the motor efficiency and rpm by controlling the switching time and duty cycle of the PWM signal. The resistors R13 and R14 may be used to create a voltage divider that adapt the motor voltage signal 113 to the CPU 36. The current of the motor coil passes through the resistor R10 and causes a voltage drop over the resistor R10. The voltage drop may be amplified by amplifier 111 for adaptation to the CPU 36. The CPU 36 now has sufficient input needed for calculating the efficiency of the motor. Preferably, the magnetic sensor 42 is placed so that the magnetic field shifting occurs before the optimum shifting point. The CPU can now delay the PWM output so that the shifting of the coil will be at the right moment for an optimum motor efficiency and change the switching point depending on the motor load and rpm. The circuit also shows how the CPU can disconnect the first filter 34 with transistor Q4 and Q5 as marked by reference numeral 112.

When the CPU is built into the motor, it is possible to use software to change the switch point when the transistors are switched during operation. In other words, the magnetic sensor of the motor may be used to determine when the switch should occur. The timing of triggering the switch greatly affects the efficiency of the motor. When this function of the CPU is used, it is necessary to move the magnetic sensor slightly relative to the optimal position because the CPU can only delay signal but not send them earlier. If the magnetic sensor sends the pulse with position information somewhat earlier than the optimal timing it is possible for the CPU to delay the sending of the PWM signal so that it is sent at the right time relative to the rpm and load on the motor (best shown in FIG. 6). This is equivalent to what can be done in a combustion engine when the ignition timing is changed depending on the rpm and load on the engine. With this solution it is also possible to measure the current flowing through the coils. By measuring the voltage connected to the windings it is possible to calculate the efficiency of the motor and then adjust the switching point so that the best efficiency is accomplished.

Figure 7:
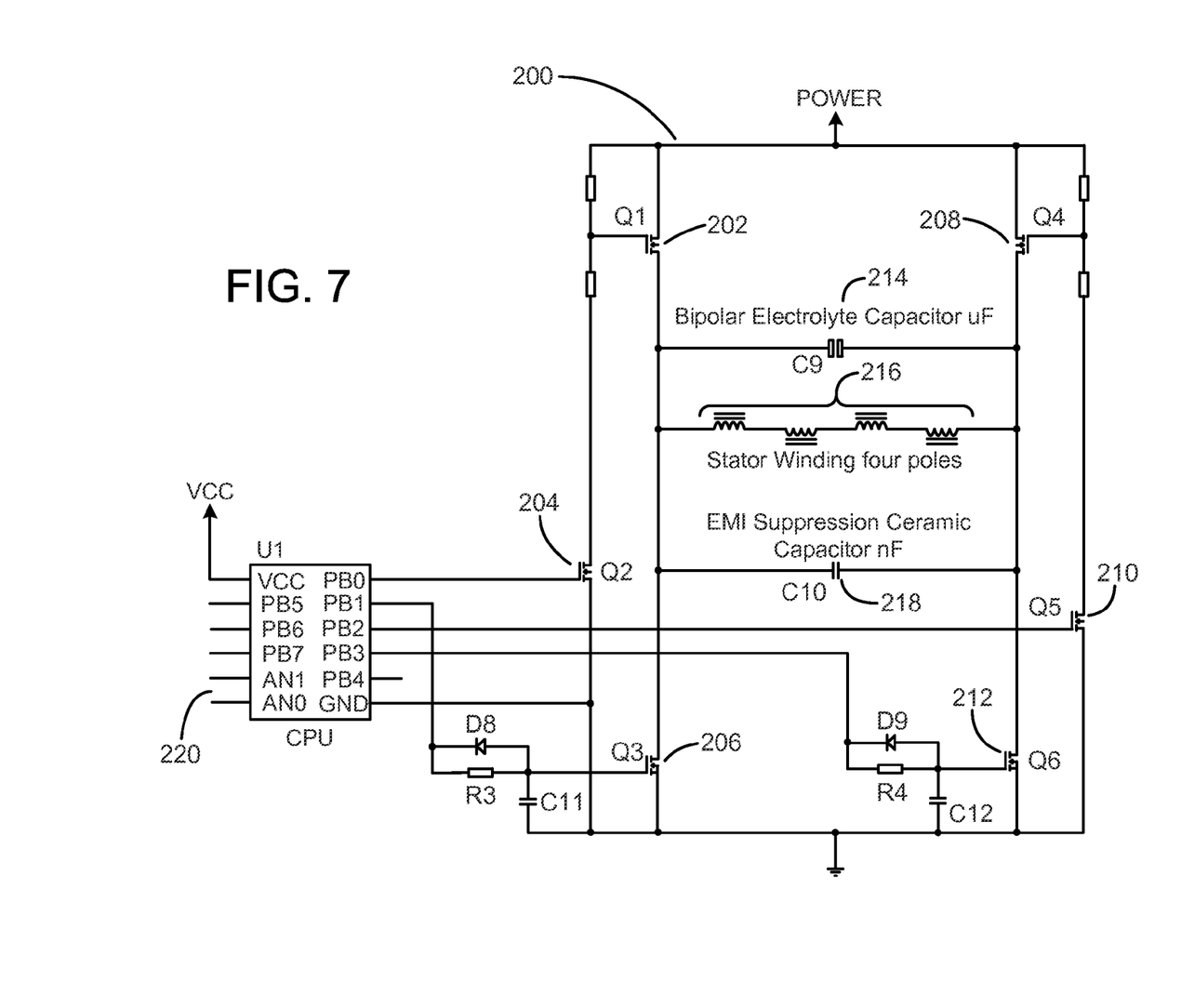
FIG. 7 is a schematic view of an H-bridge that is used in a fourth embodiment of the present invention.

FIG. 7 is a schematic view of an H-bridge 200 that may be used in connection with a fourth embodiment of the present invention. The H-bridge 200 may be used to drive the stator winding 216. More particularly, the H-bridge may, for example, include four transistors 202, 206, 208, 212 connected to the stator winding 216 and a capacitor 214, preferably a non-polarized electrolyte capacitor that is connected in parallel with the stator winding 216. Transistor 202 may be a P-FET transistor that is controlled by a N-FET transistor 204 that, in turn, is controlled by a CPU 220. When the transistor 202 is on, i.e. is conducting current, a PWM signal is sent to the N-FET transistor 212 and current, in a first direction, flows through transistor 202 and further through stator winding 216 and to GND via transistor 212. The P-FET transistor 208 is controlled by N-FET transistor 210 that in turn is controlled by CPU 220. Transistors 204 and 210 are included to obtain shiftable voltage levels because the stator winding is fed with a high voltage and the CPU is fed with a low voltage such as 3.3V or 5V. When the P-FET transistor 208 is on, i.e. is conducting current, a PWM signal is sent to N-FET transistor 206 and current flows, in the second direction, through transistor 208 and further through stator winding 216 and to GND via transistor 206. In this way, the first pair of transistors 202 and 212 may be activate at the same time to conduct current through the stator winding 216 in the first direction while the second pair of transistors 206 and 208 are in-active at the same time. The transistors 202 and 212 may then be de-activated and the transistors 206 and 208 may be activated to conduct current through the stator winding in the second direction that is opposite the first direction. Transient energy may be created in the short time delay between the deactivation of the first pair of transistors 202 and 212 and the activation of the second pair of transistors 206, 208. The transient energy created during this time delay is preferably absorbed in the capacitor 214. The time delay is preferred to avoid or reduce the risk of shorting the transistors. Similar to the embodiments described above, the capacitor 214 absorbs the transient energy created of the current flowing in the first direction during the time delay. When the active the second pair of transistors are again de-activated, and the first pair of transistors are activated, the capacitor 214 absorbs transient energy from the current that flows in the second opposite direction. As indicated above, while the transient energy fills the capacitor 214 in the second direction from the first end of the capacitor, the transient energy that was previously absorbed when the first transistor pair was de-activated is emptied from the capacitor 214 and flows out through a second end of the capacitor.

It is possible to use PNP transistors instead of P-FET transistors and it is possible to use NPN transistors instead of N-FET transistors. It is also possible to use N-FET transistors instead of P-FET transistors but it may then be necessary to use a voltage pump that increases the gate voltage of the N-FET transistors so that they can open and special drivers may be used to adapt to the CPU. Special circuits may be used for this purpose.

While the present invention has been described in accordance with preferred compositions and embodiments, it is to be understood that certain substitutions and alterations may be made thereto without departing from the spirit and scope of the following claims.

The invention claimed is:

1. A method for making a motor quieter, comprising,
generating a predetermined high frequency pulse width modulated (PWM) signal,
sending the PWM signal to a first filter,
the first filter truncating the PWM signal to provide the PWM signal with a rise time,
the rise time allowing driving transistors connected to the first filter to open smoothly,
providing a second filter having a non-polarized capacitor,
in a coil switching process, the non-polarized capacitor operating as a voltage and/or current absorption circuit between the driving transistors,
the coil switching process creating transient energy of voltage transients,
the non-polarized capacitor absorbing the transient energy, and
a magnetic sensor sending a signal to a first input of an AND gate and a CPU sending the PWM signal to a second input of the AND gate.

2. The method according to claim 1 wherein the method further comprises the step of moving the magnetic sensor to permit the CPU to delay sending the PWM signal.

3. The method according to claim 1 wherein the method further comprises the step of measuring the current and voltage of the motor to determine a motor load.

4. The method according to claim 3 wherein the method further comprises the step of determining a motor effect of the motor based on the current and voltage of the motor and improving an efficiency of the motor by moving a switching point for activating the stator windings.

5. The method according to claim 1 wherein the method further comprises the step of using the PWM signal to control revolutions per minute (rpm) of the motor.

6. The method according to claim 1 wherein the method further comprises the step of the non-polarized capacitor suppressing noise from the voltage transients.

7. The method according to claim 1 wherein the method further comprises the step of using zener diodes to limit the voltage transients.

8. The method according to claim 1 wherein the method further comprises the step of a CPU disconnecting the non-polarized capacitor when revolutions per minute (rpm) of the motor are below a threshold value.

\* \* \* \* \*